United States Patent
Pudenz

(10) Patent No.: US 9,418,264 B2
(45) Date of Patent: Aug. 16, 2016

(54) ANTENNA

(71) Applicant: SICK AG, Waldkrich (DE)

(72) Inventor: Florian Pudenz, Waldkrich (DE)

(73) Assignee: SICK AG, Waldkirch (DE)

( * ) Notice: Subject to any disclaimer, the term of this patent is extended or adjusted under 35 U.S.C. 154(b) by 225 days.

(21) Appl. No.: 14/245,381

(22) Filed: Apr. 4, 2014

(65) Prior Publication Data

US 2014/0306008 A1    Oct. 16, 2014

(30) Foreign Application Priority Data

Apr. 12, 2013 (EP) .................................... 13163461

(51) Int. Cl.
  *H01Q 1/38* (2006.01)
  *G06K 7/10* (2006.01)
  *H01Q 9/04* (2006.01)

(52) U.S. Cl.
  CPC .......... *G06K 7/10316* (2013.01); *H01Q 9/0407* (2013.01); *H01Q 9/0442* (2013.01)

(58) Field of Classification Search
  CPC ......................... G06K 7/10316; H01Q 9/0407
  USPC ......................................... 343/700 MS, 702
  See application file for complete search history.

(56) References Cited

U.S. PATENT DOCUMENTS

| | | | |
|---|---|---|---|
| 6,127,977 A | 10/2000 | Cohen | |
| 7,148,850 B2 | 12/2006 | Puente Baliarda et al. | |
| 7,239,283 B2 | 7/2007 | Chua | |
| 8,106,832 B2* | 1/2012 | De Vita | H01Q 9/0407 343/700 MS |
| 8,154,463 B2* | 4/2012 | Baliarda | H01Q 1/36 343/700 MS |
| 2005/0128148 A1* | 6/2005 | Anguera Pros | H01Q 1/36 343/700 MS |
| 2011/0140977 A1* | 6/2011 | Yang | H01Q 1/2216 343/725 |

FOREIGN PATENT DOCUMENTS

| | | |
|---|---|---|
| EP | 1667282 A1 | 7/2006 |
| WO | 2004/010535 A1 | 1/2004 |
| WO | 2004/049501 A1 | 6/2004 |
| WO | 2011/159262 A1 | 12/2011 |

OTHER PUBLICATIONS

Notis, Dimitris T., et al., "Dual Polarized Microstrip Patch Antenna, Reduced in Size by Use of Peripheral Slits" 7th European Conference on Wireless Technology, Oct. 12, 2004, pp. 273-276.
Search Report dated Jul. 11, 2013, for corresponding EP Application No. 13163461.0.

* cited by examiner

*Primary Examiner* — Hoanganh Le
(74) *Attorney, Agent, or Firm* — Nath, Goldberg & Meyer; Jerald L. Meyer

(57) ABSTRACT

An antenna (18), in particular a patch antenna, is provided having a planar resonator element (22) which has the geometry of a polygon with a plurality of edges, wherein the resonator element (22) has a plurality of slots (26) at the edges for their extension and additionally has a plurality of projections (28) at the edges.

16 Claims, 4 Drawing Sheets

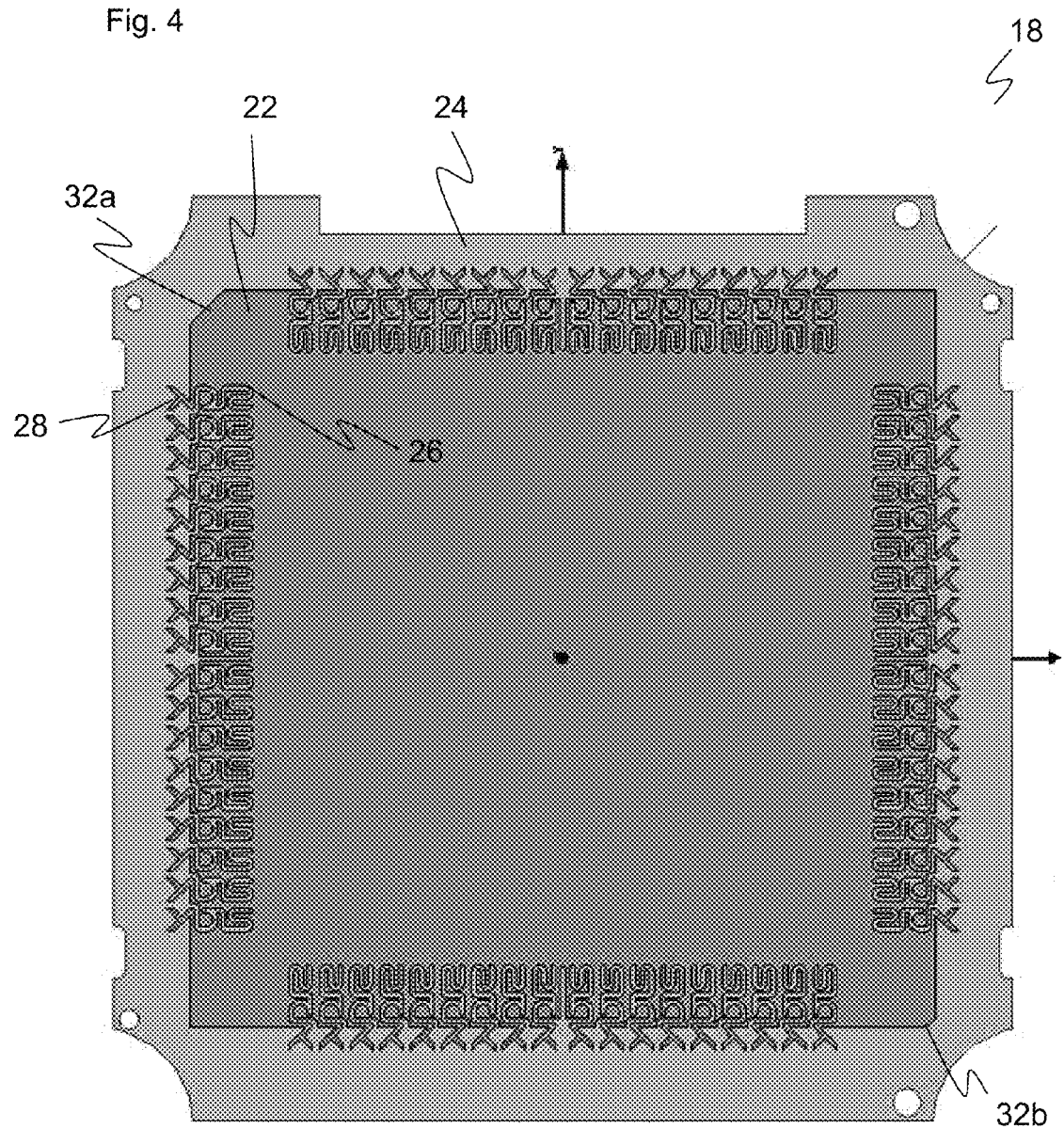

Figure 1:
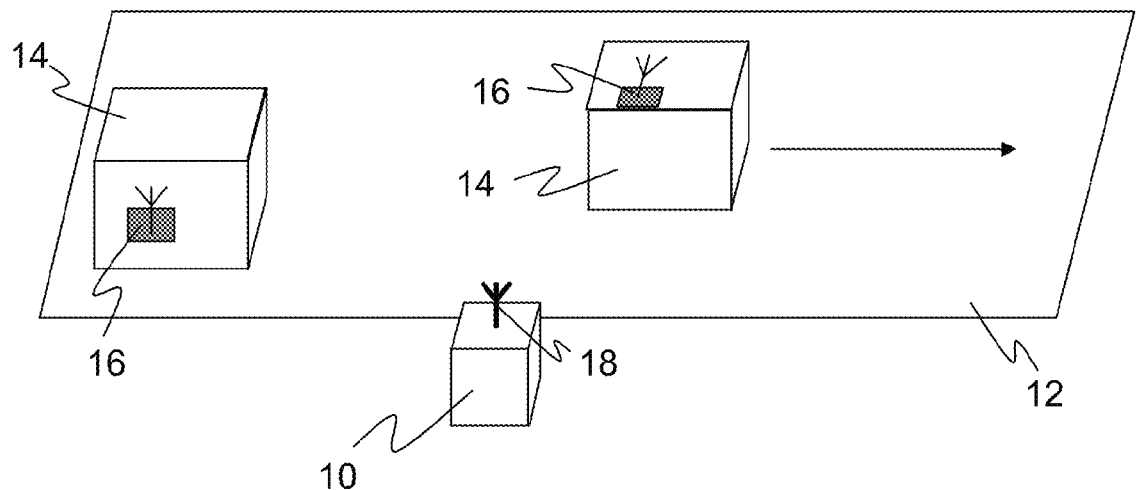

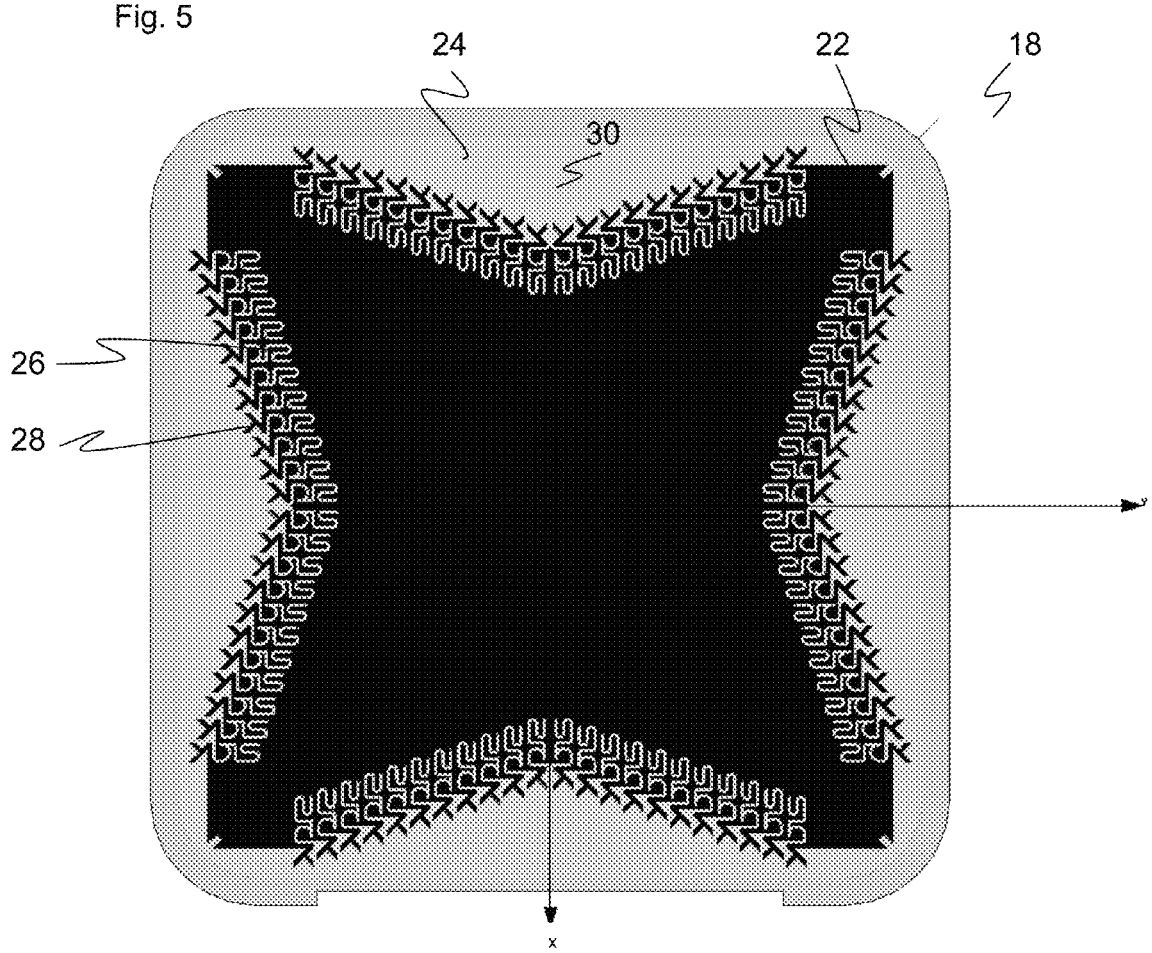
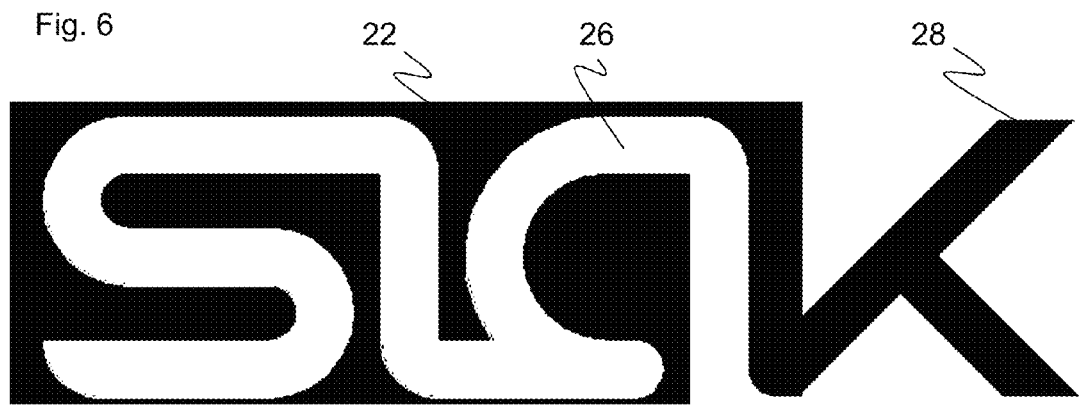

ANTENNA

The invention relates to an antenna, in particular to a patch antenna, having a planar resonator element in accordance with the preamble of claim 1 as well as to a corresponding method for transmitting and/or receiving electromagnetic signals.

Such an antenna is required, for example, in an RFID (radio frequency identification) reading system. Such RFID reading systems serve for the identification of objects and products and are used inter alia to automate logistical movements. RFID transponders fastened to the products are read out at an identification point, above all on a change of the owner of the product or on a change of the transport means, and information is optionally written back into the transponder. This results in fast and traceable logistical movements. The detected information is used to control the forwarding and sorting of goods and products. Important applications for automatic identification are logistical distribution centers, for instance of package shippers, or the baggage check-in at airports.

A frequent deployment site of an RFID reading system is the installation at a conveyor belt on which the goods are conveyed or in a so-called reading portal. Any desired passageway is to be understood by this which is equipped with one or more RFID readers and possibly with further sensors. Objects are moved through the reading portal by means of a conveyor belt, by means of a transport vehicle such as a forklift, or also manually and are in so doing identified with respect to their RFID transponder.

RFID transponders can be active in principle, that is can have their own energy supply, or can be of passive design. Independently of whether they are active or passive components, RFID transponders which operate in accordance with the backscatter principle are characterized in that they reflect the transmitted signal of the reading apparatus and in so doing change it by modulation in amplitude. They do not produce any radio frequency signal of their own in so doing. In practice, however, active transponders are less suitable for logistics because the unit prices for such transponders cannot reach the low level required for the mass market due to the energy supply. Passive transponders without their own energy supply are therefore usually used. In both cases, the transponder is excited to radiate the stored information by electromagnetic radiation of the reading apparatus, with passive transponders taking the required energy from the transmission energy of the reading system. In the established ultra-high frequency (UHF) standard ISO 18000-6, passive transponders are read out using the backscatter process.

Since a large proportion of the available transponders have linear polarization and since the orientation of the transponder with respect to the antenna of the reading apparatus cannot be unambiguously defined in a number of applications, antennas with circular polarization are preferably used for use in RFID reading apparatus.

So that a device such as an RFID reading system which transmits and receives electromagnetic waves can have a design which is as compact as possible, there is a demand for correspondingly compact antennas. The required antenna size in this respect depends on the frequency. This is in turn not a free parameter since, for example, a frequency range between 850 MHz and 950 MHz is provided for UHF, within which range frequencies can be used which are determined for specific countries.

A large number of possibilities are known in the prior art for reducing the antenna size for a specific frequency range. On the one hand, the resonator, that is the actual antenna element, can be covered by a material having a higher dielectric constant. However, this results in additional antenna losses and in a reduction in the bandwidth.

Alternatively, geometrical changes to the antenna structure are conceivable. A known antenna family in accordance with this approach are the fractal antennas which are described, for example in U.S. Pat. Nos. 6,127,977 or 7,148,850. Unlike with conventional patch antennas, the resonator is here not configured simply as a full-surface metal plate, but rather as a fractal structure. As is typical with a fractal, a self-repeating pattern is therefore generated in that a geometric generatrix is selected whose pattern repeats at different positions, orientations and scales in dependence on the order of the fractal on the antenna patch. The extent of the antenna patch is thereby substantially extended and even becomes infinitely long in a mathematical idealization. The fractal which is finely branched in this manner admittedly allows the design of a compact antenna, but has the disadvantage that the bandwidth of the antenna reduces very considerably because the surrounded conductive region becomes too small.

It is known from the paper by D. T. Notis et al, "Dual polarized microstrip patch antenna, reduced in size by use of peripheral slots," 7th European Conference on Wireless Technology, Oct. 12, 2004, pages 273-276, to provide the edges of a patch antenna with slits (slots) to reduce the patch size. The reduction in size thus achievable is, however, not yet sufficient in practice.

It is therefore the object of the invention to find an antenna shape which is as compact as possible.

This object is satisfied by an antenna having a planar resonator element in accordance with claim 1 as well as by a corresponding method for transmitting and/or receiving electromagnetic signals. In this respect, the invention starts from the basic idea of increasing the extent of the planar resonator element. This extension takes place in two directions; on the one hand, by slots which remove material of the resonator element toward the interior and, on the other hand, by projections which add material to the resonator element toward the exterior.

The antenna is in particular a patch antenna. The resonator element, called a patch in the case of a patch antenna, has a thin, conductive material layer, as a rule a metal surface. In a plan view, the resonator element as a whole forms a simple geometry which can be described by a polygon having few angles, for example a quadrangle, a hexagon or the like. The slots and projections are superposed on this simple basic shape, but with the polygonal geometry being maintained overall. A polygon provided with slots and projections in this manner differs considerably from a fractal. There is no generatrix, no iteration of the application of this generatrix at higher orders and no self-similarity on different scales. With a fractal antenna, the basic geometry is also predefined by the fractal and can thus in no way be described by a polygon. This has an effect on the surrounded conductive region and thus on the bandwidth. Alternatively, the resonator element can also be configured as a cut-out in a metallic surface as a slot radiator or slot antenna.

The invention has the advantage that a very small construction shape for the antenna is made possible. In addition, the bandwidth remains higher than with fractal antennas, for example. Antennas with greater bandwidth can thereby be realized.

A slot and/or a projection preferably respectively form a pattern. The slot or projection is thus structured per se and is not merely a straight slot or a straight projection respectively. The extent of the resonator element is thereby extended to an even greater degree. A further advantage of the folded slot structure is that folded slots can be positioned further in the corner regions of the structure. In this manner, additional or longer slot elements can be positioned at the outer edges of a patch structure without overlaps occurring with slot elements of an adjacent edge.

The pattern is preferably a structure folded into itself a multiple of times. The slot or projection therefore extends in both directions of the area of the resonator element and for this purpose comprises a plurality of waves, curves, branches or the like. The pattern is preferably one-dimensional, that is as-it-were drawn as a line. In this connection, one-dimensional should naturally not be understood in a mathematical sense, but rather a certain width should remain which, however, does not result in any planar elements within the pattern.

A projection preferably continues the respective pattern of a slot toward the exterior. The same could also be said in the converse case; the result in each case is that the slot and projection form a pattern together. This preferably applies to all slots and projections which are thus present in the same number and are associated with one another. Alternatively, however, the projections and slots can also form respective patterns of their own in part or in total.

The edges preferably have the pattern formed by slots and/or projections in a multiple form. A basic pattern thus results which is repeated by the slots and/or projections at the total edge or at an edge section. The patterns are in this respect preferably arranged equidistant from one another.

A pattern repeated in each case on the one side of an edge center is preferably mirrored along an edge at a perpendicular to the edge with respect to a pattern repeated at the other side of the edge center. With antennas for transmitting and receiving circularly polarized waves, this preferably does not only apply to only one pattern or to some of the patterns, but to all of them. If therefore an axis of symmetry is imagined perpendicular to and through the center of the edge, the patterns above this axis of symmetry are mirrored into the patterns below the axis of symmetry. For this purpose, the patterns are configured as mirrored in accordance with the required symmetry depending on their position with respect to the edge center and are furthermore arranged at a suitable spacing with respect to the edge center. This results in the symmetrical antenna properties. The individual pattern itself is in this respect preferably not symmetrical, that is cannot be changed back into itself by axial mirroring or point mirroring. More freedom in the design of the pattern is thereby obtained.

The pattern is preferably configured perpendicular to the respective edge. There is therefore a main direction of the slots and projections which give the pattern an orientation which is oriented perpendicular to the edge. The finer pattern structures are superposed on this main direction. The patterns are thus tilted with respect to one another on the resonator element depending on the edge at which they are arranged.

The pattern is preferably lettering. This is an example for a pattern which is folded in itself a multiple of times and has a main direction. It is also frequently possible to configure such a pattern as one-dimensional, that is as-it-were to produce it as a line. It becomes very easily recognizable by the design as lettering whether the pattern has been correctly applied at the edges. Since the antenna is as a rule applied with access from outside, the lettering also remains visible in operation and thus allows a monitoring for damage to the antenna. The pattern is even more preferably a logo, for example a corporate logo. This is an example for easily recognizable lettering.

The resonator element preferably has a chamfer at at least one corner. Chamfers of different sizes can in particular be provided at a plurality of corners. If, for example, the resonator element has a rectangular geometry overall, two oppositely disposed corners are chamfered in an embodiment. This chamfering can take place in different manners, with therefore more being cut off at one corner than at the other. Additional degrees of freedom are thereby obtained to adapt the antenna properties, for example to improve the circular polarization of an antenna or to compensate non-symmetrical properties of a housing or of other components influencing the antenna.

The polygon is preferably a rectangle whose extent in the one direction exceeds the extent in the direction perpendicular thereto by less than five percent, two percent or one percent. The deviation from a square therefore deliberately remains very small, for example in an order of magnitude of approximately 0.5 mm over an edge length of approximately 100 mm. A degree of freedom in the antenna design is thereby obtained to break symmetry properties or to symmetrize antenna properties again under external influences. A square can, however, also be considered as an alternative polygon.

The polygon preferably has an indentation at at least one edge. The basic shape of the resonator element is thereby adapted. In principle, a polygon with indentations at the edges is also a polygon. It is therefore meant here that a simple convex basic shape is interrupted by an indentation at at least one edge or even at all edges. A pattern formed by the slots and projections is preferably applied only in the region of the indentation.

In a preferred further development, an RFID reading apparatus having at least one antenna in accordance with the invention for transmitting RFID signals to an RFID transponder and/or for receiving RFID signals from an RFID transponder is provided, with the RFID reading apparatus furthermore having an evaluation unit for encoding RFID information into the RFID signals and/or for reading RFID information out of the RFID signals. The antenna allows a particularly compact construction shape of the RFID reading apparatus while continuing to cover the required frequency band, for example in the UHF range. Such an RFID reading apparatus is preferably used in stationary installation at a reading zone of a conveyor or of a reading portal for reading out at least one RFID transponder moved on the conveyor or through the reading portal.

The method in accordance with the invention can be further developed in a similar manner and shows similar advantages in so doing. Such advantageous features are described in an exemplary, but not exclusive manner in the subordinate claims dependent on the independent claims.

Figure 2:
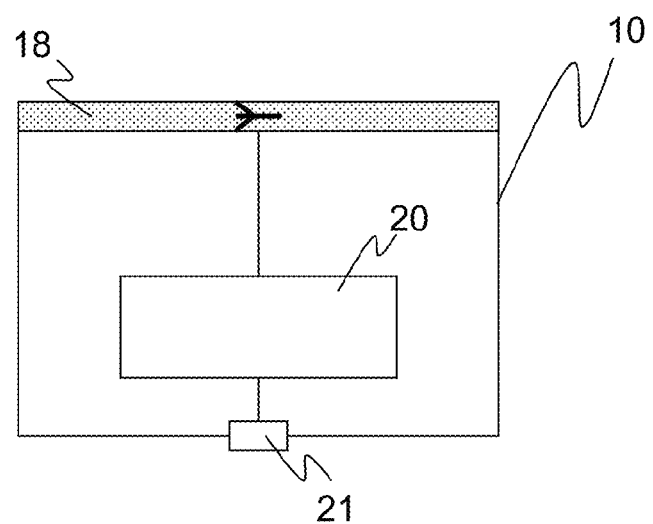
Figure 3:
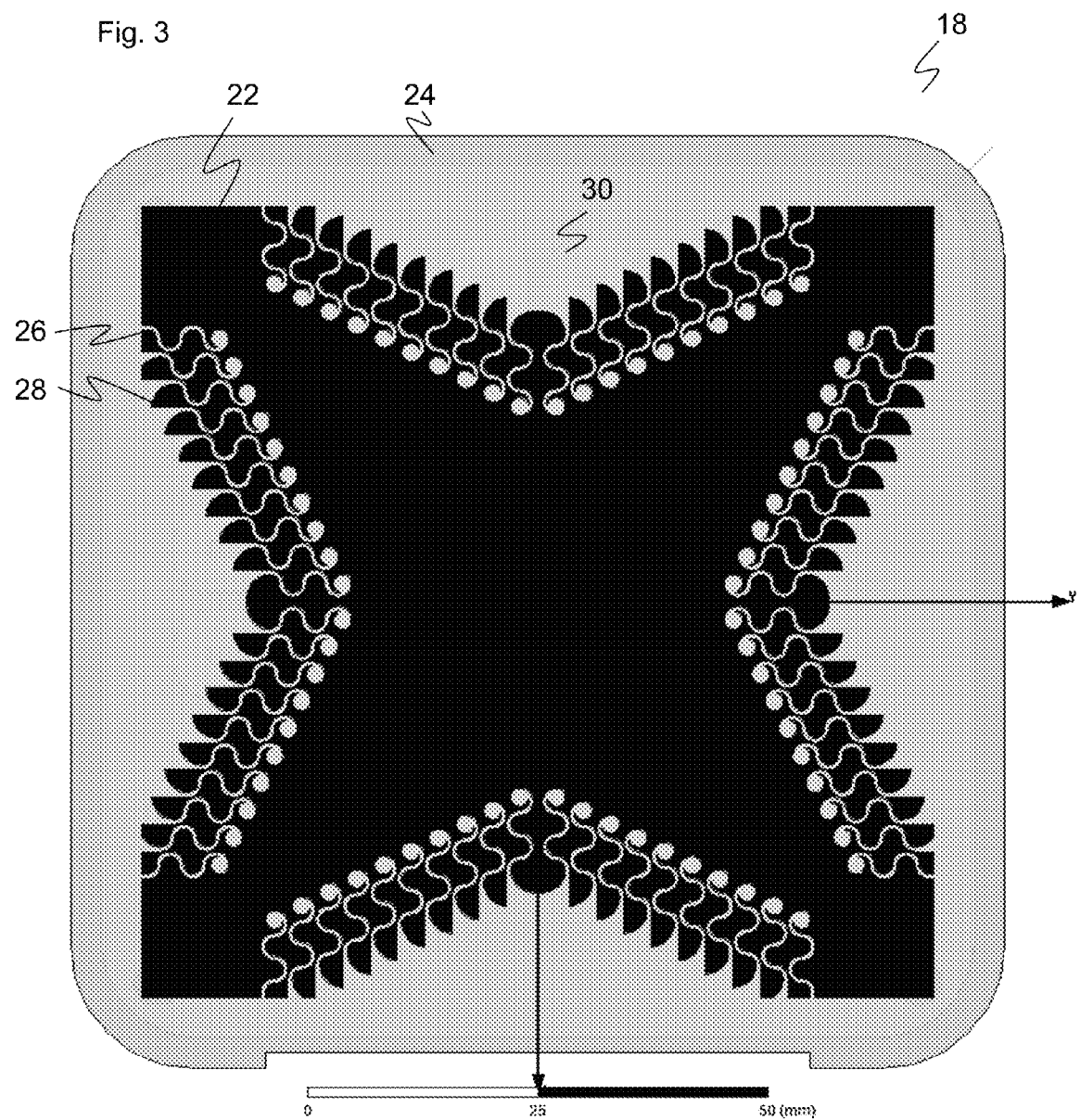

The invention will be explained in more detail in the following also with respect to further features and advantages by way of example with reference to embodiments and to the enclosed drawing. The Figures of the drawing show in:

FIG. 1 a schematic three-dimensional overview representation of a use of an RFID reader at a conveyor belt;

FIG. 2 a block diagram of an RFID reader;

FIG. 3 a plan view of the resonator element of an embodiment of an antenna; and

FIG. 4 a plan view of the resonator element of a further embodiment of an antenna;

FIG. 5 an overview of the resonator element in a variant of the embodiment shown in FIG. 4; and FIG. 6 a detail representation of an individual pattern of the resonator element shown in FIGS. 4 and 5.

FIG. 1 shows a schematic overview representation of an RFID reader 10 which is installed at a conveyor belt 12. Objects 14 which are provided with RFID transponders 16 are moved past the RFID reader 10 on the conveyor belt 12. It is the task of the RFID reader 10 to receive signals from the RFID transponders to read out information stored therein.

Depending on the application, provision can conversely also be made that the RFID reader 10 stores information on an RFID transponder 16.

The RFID reader 10 has a reading reception antenna 18 for receiving RFID signals for this purpose. The antenna 18 can additionally be used as a transmission antenna for writing processes on an RFID transponder 16 and for the supply of RFID transponders 16 with a carrier signal. Alternatively, a separate transmission antenna, not shown, is provided for this purpose. The more exact design of an RFID reader 10 and of a transponder 16 as well as their communication between one another are known per se to the skilled person and are therefore not explained in any more detail here.

FIG. 2 shows the RFID reader 10 in a very simplified block representation. A control and evaluation unit 20 of the RFID reader 10 is connected to the antenna 18 to evaluate RFID signals received by means of the antenna 18 or to transmit information to a transponder as RFID signals. The control and evaluation unit 20 is furthermore connected to a wired or wireless interface 21 to exchange data, to carry out parameterizations and the like.

The element improved with respect to known RFID readers 10 is the antenna 18 which is only shown schematically in FIG. 2. The antenna 18 is preferably fed at two points to transmit circularly polarized waves. A circular polarization on feeding at only one or at more than two points can, however, also be realized. A corresponding antenna structure is also conceivable with only one feed point for linear polarization. For a simple manufacture, the antenna 18 is furthermore preferably configured as a patch antenna whose resonator is formed by a thin metal layer. The antenna 18 was introduced in connection with the example of an RFID reader 10, but can also be used in other devices.

FIGS. 3 to 6 show plan views of a plurality of embodiments of the antenna 18 with its resonator 22 ("antenna patch") on a carrier board 24. The resonator 22 has a simple polygonal basic shape; in the examples shown a rectangle in each case. The outer contour of the resonator 22 is extended at the edges by slots 26 and projections 28. Expressed in general terms, the edge is therefore folded repeatedly with a pattern.

FIG. 3 shows a first embodiment of the resonator 22. The triangular basic shape is first modified by indentations 30, whereby the outer contour is extended a first time. In the region of the indentations 30, the edges are extended with a repeated wave pattern which respectively has a wave-shaped slot 26 and a projection 28 continuing the wave to the outside. The pattern could also, deviating from the representation, equally be applied outside the indentations 30 provided that sufficient space remains for it.

As can easily be recognized in FIG. 3, the pattern has a preferred direction which is in each case perpendicular to the edge of the basic rectangular shape of the resonator 22. The pattern then varies about this preferred direction so-to-say in a second order by a plurality of waves. The patterns are identical to one another and are applied equidistantly. If a single edge of the resonator 22 is looked at, starting from the center, the patterns in the one direction are mirrored with respect to the patterns in the other direction. A mirror symmetry of the resonator 22 with respect to all central center axes thereby results overall.

The wave pattern of FIG. 3 is only one of innumerable conceivable examples of how a pattern can be formed from slots 26 and projections 28. The most simple conceivable embodiment would be a straight slot 26 which is extended beyond the edge by a straight projection 28. However, additional structure is preferably given to the slots 26 and projections 28 in that arcs, curves or branches are added and thus a pattern is created which is folded into itself multiple times to further extend the outer contour. It is advantageous in this respect for circularly polarized antennas if the symmetry properties in accordance with FIG. 3 are maintained, that is the patterns are the same as each other, are mirrored with respect to the respective edge center and are equidistant. Patterns which are the same substantially facilitate the antenna design and the simulation of the antenna properties. In principle, however, it is also possible to work with multiple patterns or with different mutual spacings of the patterns. In this respect, however, the symmetry should also preferably be maintained with respect to the main axes.

FIG. 4 shows a further embodiment of the antenna 18. Instead of a wave pattern as in FIG. 3, the slots 26 and the projections 28 here form lettering or a logo. As a further difference from the embodiment of FIG. 3, the indentations 30 are additionally dispensed with here. An embodiment with such indentations 30 is, however, also conceivable and is illustrated in FIG. 5. The general arrangement with multiple equidistant repetition of the lettering, with a perpendicular orientation with respect to the respective edge and with a mirroring with respect to the edge center corresponds to that of the wave pattern in FIG. 3. Variations in which a plurality of different patterns or non-equidistant spacings are used are also conceivable with lettering.

FIG. 6 shows a detail enlargement of an individual pattern formed as lettering. Lettering forms a pattern in the same way as a wave in the form of a structure folded in itself multiple times and thus substantially extends the outer contour of the resonator 22. The lettering has the additional advantage that the eye can perceive it directly. Damage to the resonator is thereby immediately detected, for example. The lettering can be substantially drawn in a line, but also have branching points to form corresponding letters such as the "K" and has various arcs and corners. The portion of the lettering formed by projections 28 is slightly offset with respect to the slots 26 by their width so that the slot 26 remains outwardly open or the projection 28 remains conductively connected to the resonator 22.

It is conceivable to apply deliberate deviations from the symmetry of the resonator 22, for example to compensate non-symmetrical influences of a housing or of other components of the RFID reader 10. Such a measure is illustrated in FIG. 4 where the top left corner and the bottom right corner each have a chamfer 31*a-b* which additionally cut off a differently sized corner region. A further measure is not recognizable with the naked eye and comprises the basic shape of the resonator 22 deviating minimally, i.e. by a few percent or even by less than one percent, from a square. The resonator 22 is therefore configured slightly larger in the X direction, for example, than in the Y direction It is possible with the aid of the pattern formed from slots 27 and projections 28 to reduce the area of the resonator 22 by more than half with the same frequency range.

The invention claimed is:

1. An antenna (18) having a planar resonator element (22) which has the geometry of a polygon with a plurality of edges, wherein the resonator element (22) has a plurality of slots (26) at the edges for their extension,
   wherein the resonator element (22) additionally has a plurality of projections (28) at the edges, at least one of the slots (26) and/or at least one of the projections (28) respectively form/forms a pattern, and the pattern (26, 28) is lettering.

2. The antenna (18) in accordance with claim 1, wherein the antenna is a patch antenna.

3. The antenna (18) in accordance with claim 1, wherein the pattern (26, 28) is a structure folded into itself multiple times.

4. The antenna (18) in accordance with claim 1, wherein a projection (28) respectively continues the pattern (26, 28) of a slot (28) toward the exterior.

5. The antenna (18) in accordance with claim 1, wherein the edges have the pattern (26, 28) formed by slots (26) and/or projections (28) in multiple form.

6. The antenna (18) in accordance with claim 5, wherein a pattern (26, 28) respectively repeated at the one side of an edge center is mirrored along an edge with respect to a pattern (26, 28) mirrored at a perpendicular to the edge at the other side of the edge center.

7. The antenna (18) in accordance with claim 1, wherein the pattern (26, 28) is formed perpendicular to the respective edge.

8. The antenna (18) in accordance with claim 1, wherein the pattern (26, 28) is a logo.

9. The antenna (18) in accordance with claim 1, wherein the resonator element (22) has a chamfer (32*a-b*) at at least one corner.

10. The antenna (18) in accordance with claim 1, wherein the polygon is a rectangle whose extent in the one direction exceeds the extent in the direction perpendicular thereto by less than one of five percent, two percent and one percent.

11. The antenna (18) in accordance with claim 1, wherein the polygon has an indentation (30) at at least one edge.

12. An RFID reading apparatus (10) having at least one antenna (18) for transmitting RFID signals to an RFID transponder (16) and/or for receiving RFID signals from an RFID transponder (16) and having an evaluation unit (20 for encoding RFID information into the RFID signals and/or reading RFID information out of the RFID signals, wherein the antenna (18) has a planar resonator element (22) which has the geometry of a polygon with a plurality of edges, wherein the resonator element (22) has a plurality of slots (26) at the edges for their extension,
 wherein the resonator element (22) additionally has a plurality of projections (28) at the edges.

13. An RFID reading apparatus (10) in accordance with claim 12 for the stationary installation at one of a reading zone of a conveyor (12) and a reading portal for reading out at least one RFID transponder (16) moved on the conveyor (12) or through the reading portal.

14. A method of transmitting and/or receiving electromagnetic signals, using an antenna (18) having a planar resonator element (22) which has the geometry of a polygon with a plurality of edges, wherein the resonator element (22) has a plurality of slots (26) at the edges for their extension,
 wherein the resonator element (22) additionally has a plurality of projections (28) at the edges, at least one of the slots (26) and/or at least one of the projections (28) respectively form/forms a pattern, and the pattern (26, 28) is lettering.

15. The method in accordance with claim 14, wherein the electromagnetic signals transmitted and/or received are RFID signals.

16. An antenna (18) having a planar resonator element (22) which has the geometry of a polygon with a plurality of edges, wherein the resonator element (22) has a plurality of slots (26) at the edges for their extension,
 wherein the resonator element (22) additionally has a plurality of projections (28) at the edges, at least one of the slots (26) and/or at least one of the projections (28) respectively form/forms a pattern, and the pattern (26, 28) is a logo.

* * * * *